United States Patent
Cui et al.

(10) Patent No.: US 11,188,754 B2
(45) Date of Patent: Nov. 30, 2021

(54) METHOD FOR IMPROVING ROBUSTNESS OF VISUAL-INERTIAL NAVIGATION SYSTEM, AND ROBOT THEREOF

(71) Applicant: CLOUDMINDS (BEIJING) TECHNOLOGIES CO., LTD., Beijing (CN)

(72) Inventors: Huakun Cui, Beijing (CN); Kai Wang, Beijing (CN); Shiguo Lian, Beijing (CN)

(73) Assignee: CLOUDMINDS (BEIJING) TECHNOLOGIES CO., LTD., Beijing (CN)

(*) Notice: Subject to any disclaimer, the term of this patent is extended or adjusted under 35 U.S.C. 154(b) by 0 days.

(21) Appl. No.: 16/725,755

(22) Filed: Dec. 23, 2019

(65) Prior Publication Data
US 2020/0210701 A1    Jul. 2, 2020

(30) Foreign Application Priority Data
Dec. 26, 2018    (CN) .......................... 201811603305.6

(51) Int. Cl.
G06K 9/00    (2006.01)
G06T 7/269    (2017.01)
G06T 7/246    (2017.01)
G06K 9/62    (2006.01)

(52) U.S. Cl.
CPC ....... *G06K 9/00664* (2013.01); *G06K 9/6201* (2013.01); *G06T 7/248* (2017.01); *G06T 7/269* (2017.01)

(58) Field of Classification Search
CPC ............. G06K 9/00664; G06K 9/6201; G06K 9/6292; G06K 9/00671; G06T 7/269; G06T 7/248; G06T 7/74; G06T 2207/30244; G06T 2207/10016
See application file for complete search history.

(56) References Cited

U.S. PATENT DOCUMENTS

| | | | |
|---|---|---|---|
| 10,162,362 B2 * | 12/2018 | Tsai | G06K 9/4676 |
| 2014/0192210 A1 | 7/2014 | Gervautz et al. | |
| 2016/0327395 A1 | 11/2016 | Roumeliotis et al. | |
| 2016/0349362 A1 * | 12/2016 | Rohr | G01S 5/0263 |
| 2017/0219717 A1 * | 8/2017 | Nallampatti Ekambaram | G01S 11/12 |
| 2018/0231385 A1 * | 8/2018 | Fourie | G01C 22/00 |

FOREIGN PATENT DOCUMENTS

| | | | |
|---|---|---|---|
| CN | 107869989 A | | 4/2018 |
| CN | 108592919 A | * | 9/2018 |
| CN | 108592919 A | | 9/2018 |
| CN | 108827315 A | | 11/2018 |
| KR | 20150082379 A | * | 7/2015 | G06K 9/00201 |

OTHER PUBLICATIONS

Office Action dated Sep. 3, 2021;Chinese Patent Application No. 2018116033056.

* cited by examiner

*Primary Examiner* — Matthew C Bella
*Assistant Examiner* — Kathleen M Broughton

(57) ABSTRACT

A method for improving robustness of a visual-inertial navigation system includes: determining a reference frame; correcting the reference frame; and performing non-linear optimization for frames other than the reference frame and an oldest frame according to the oldest frame and the corrected reference frame.

16 Claims, 11 Drawing Sheets

METHOD FOR IMPROVING ROBUSTNESS OF VISUAL-INERTIAL NAVIGATION SYSTEM, AND ROBOT THEREOF

CROSS-REFERENCE TO RELATED APPLICATIONS

This application claims priority to Chinese Patent Application No. 201811603305.6, filed with the Chinese Patent Office on Dec. 26, 2018, titled "METHOD AND APPARATUS FOR IMPROVING ROBUSTNESS OF VISUAL-INERTIAL NAVIGATION SYSTEM, AND ROBOT THEREOF", the entire contents of which are incorporated herein by reference.

TECHNICAL FIELD

Embodiments of the present application relate to the field of vision and inertial navigation-fused simultaneous localization and mapping, and in particular, relate to a method and apparatus for improving robustness of a visual-inertial navigation system and a robot thereof.

BACKGROUND

In a simultaneous localization and mapping (SLAM) system, a subject equipped with a specific sensor, for example, a robot, an unmanned aerial vehicle (UAV), an augmented reality (AR) device or the like establishes a model of an environment in the motion thereof and meanwhile estimates the motion thereof on the premise of no environment prior information. The sensor in the SLAM may be a visual camera, an inertial measurement unit (IMU), a GPS, a laser radar or the like. The sensor discussed in this specification may include the vision and the IMU. Generally, the SLAM system fusing the visual camera and the IMU is referred to as a visual-inertial system (VINS) or a visual-inertial odometry (VIO), that is the visual-inertial navigation system.

The VIO may be categorized into loose coupling and tight coupling according to whether state vectors of the vision and the IMU are optimized together. In a loose coupling VIO system, and a vision constraint of a re-projection error provided by the vision and an interframe constraint provided by the IMU are placed into a global target function for optimization. However, when fast rotation, fast motion, camera shielding or no texture occurs, the vision constraint may be lost. This case is common in the AR and the robot. Using such an AR device as a mobile phone as an example, in case of fast motion, due to such factors as motion blur, an image may be blurred. In this case, it is impossible to perform visual feature point detection and tracking in such an image.

When the vision constraint is lost, only the IMU constraint is effective in the global target function of the VIO system. However, due to accumulated errors of the IMU, the calculated state vectors may be subject to errors. In a stationary state after the vision constraint is lost, the trajectory of the camera may still be drifted faster along a direction.

SUMMARY

An embodiment of the present application provides a method for improving robustness of a visual-inertial navigation system. The method includes: determining a reference frame; correcting the reference frame; and performing non-linear optimization for frames other than the reference frame and an oldest frame according to the oldest frame and the corrected reference frame.

Another embodiment of the present application provides a robot. The robot includes: a processor, a memory, a communication interface and a communication bus; wherein the processor, the memory and the communication bus communicate with each other via the communication bus; and the memory is configured to store at least one executable instruction, wherein the executable instruction, when being executed by the processor, causes the processor to perform the steps of: determining a reference frame; correcting the reference frame; and performing non-linear optimization for frames other than the reference frame and an oldest frame according to the oldest frame and the corrected reference frame.

Still another embodiment of the present application provides a computer-readable storage medium. The storage medium stores at least one executable instruction; wherein the executable instruction, when being executed, causes a processor to perform the steps of: determining a reference frame; correcting the reference frame; and performing non-linear optimization for frames other than the reference frame and an oldest frame according to the oldest frame and the corrected reference frame.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present application. In all the accompanying drawings, like reference signs denote like parts. In the drawings:

FIG. 7-1 illustrates states of frames in a slide window according to an embodiment of the present application;

FIG. 7-2 illustrates states of frames in a slide window according to an embodiment of the present application;

FIG. 7-3 illustrates states of frames in a slide window according to an embodiment of the present application;

FIG. 7-4 illustrates states of frames in a slide window according to an embodiment of the present application;

FIG. 8-1 illustrates states of frames in a slide window according to an embodiment of the present application;

FIG. 8-2 illustrates states of frames in a slide window according to an embodiment of the present application;

FIG. 8-3 illustrates states of frames in a slide window according to an embodiment of the present application;

FIG. 9-1 illustrates states of frames in a slide window according to an embodiment of the present application;

FIG. 9-2 illustrates states of frames in a slide window according to an embodiment of the present application;

FIG. 9-3 illustrates states of frames in a slide window according to an embodiment of the present application;

DETAILED DESCRIPTION

Some exemplary embodiments of the present application are hereinafter described in detail with reference to the accompanying drawings. Although the accompanying drawings illustrate the exemplary embodiments of the present application, it shall be understood that the present application may be practiced in various manners, and the present application shall not be limited by the embodiments illustrated herein. On the contrary, these embodiments are described herein only for the purpose of better understanding the present application, and may integrally convey the scope of the present application to a person skilled in the art.

In the technical solutions according to the embodiments of the present application, when the image acquisition device is subject to lost of the vision constraint and is thus stationary, a rotation matrix of a stationary image frame is corrected by adding a new vision constraint, and the trajectory is stopped from further drift. It is assumed that the image acquisition device may enter a stationary state after quick movement, and thus assumption is reasonable. For example, in the AR, users generally abruptly turn mobile phones to another direction and stops movement for further observation. The operations are performed in this process of keeping stationary.

Figure 1:
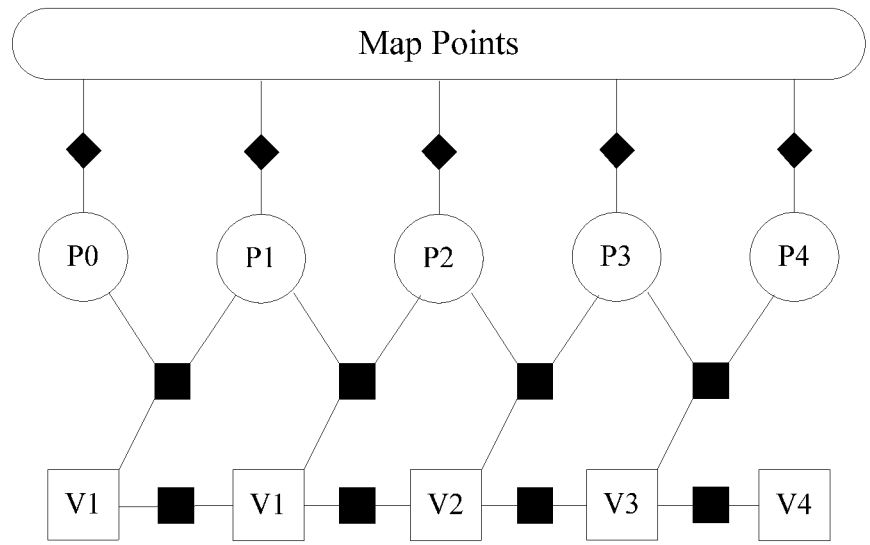
FIG. 1 illustrates states of frames in a slide window according to an embodiment of the present application.

Hereinafter, the background of the embodiments of the present application is described. In a VIO system, the idea of optimization in a slide window is employed. As illustrated in FIG. 1, herein it is assumed that five frames of images may be accommodated in the slide window, and the circular block represents a position and rotation of an $i^{th}$ frame: $P_i = [R_{b_i}^w, p_{b_i}^w]$, wherein $R_{b_i}^w$ represents a rotation of an IMU from a local coordinate system bi to a world coordinate system w, and $p_{b_i}^w$ represents a translation of the IMU from the local coordinate system bi to the world coordinate system w. As illustrated in FIG. 1, the square block represents a velocity and a bias of the $i^{th}$ frame: $V_i = [v_{b_i}^w, b_a, b_g]$, wherein $v_{b_i}^w$ represents a velocity of the IMU from the local coordinate system bi to the world coordinate system w, and $b_a$ and $b_g$ respectively represent a bias between an accelerometer and a gyroscope. As illustrated in FIG. 1, the black diamond small block represents a vision constraint, that is, a re-projection error; the black square small block represents an interframe IMU constraint; and the uppermost Map Points represent landmark points that may be all observed from all the frames in the slide window.

Figure 2:
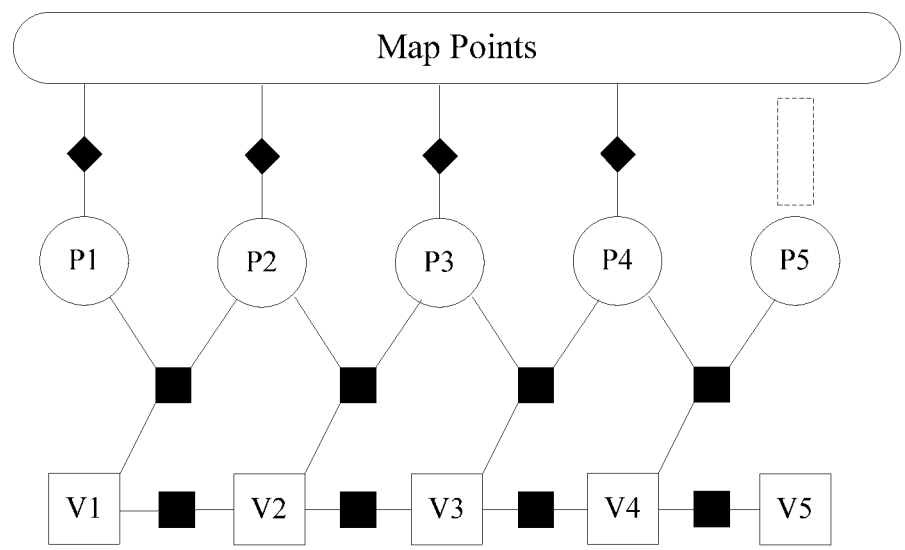
FIG. 2 illustrates states of frames in a slide window according to an embodiment of the present application.

When an acquisition point is in high-velocity rotation, the vision constraint may be lost. As illustrated in FIG. 2, P5 is an image acquired during the high-velocity rotation. Due to the issues such as movement blur and the like, visual tracking fails, and thus the vision constraint is lost (as illustrated in the dotted-line block). Herein, all state vectors are optimized according to the IMU constraint. The oldest frame P0 is marginalized to maintain the count of frames in an active window to be fixed.

Figure 3:
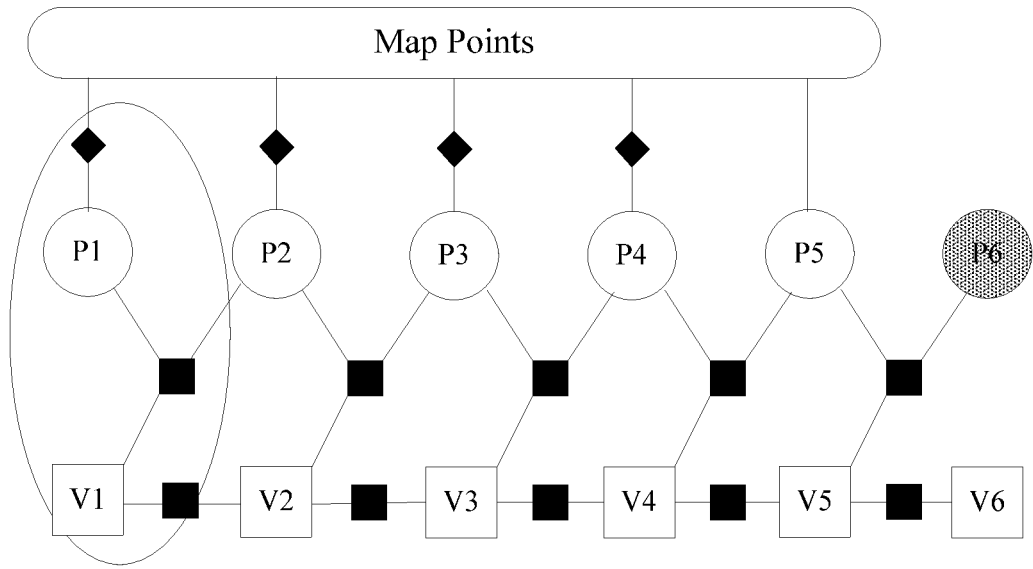
FIG. 3 illustrates states of frames in a slide window according to an embodiment of the present application.

When the acquisition point abruptly enters a stationary state upon high-velocity rotation, although the image is clear, the blurred image P5 in the rotation process may still not be tracked in a first frame P6 after the acquisition point enters the stationary state. Therefore, the vision constraint may not be introduced, as illustrated in FIG. 3. In this case, the oldest frame P1 may be still marginalized. At this time, an error state calculated in the rotation process may still not be corrected, and thus the first frame P6 is subject to some problems.

Figure 4:
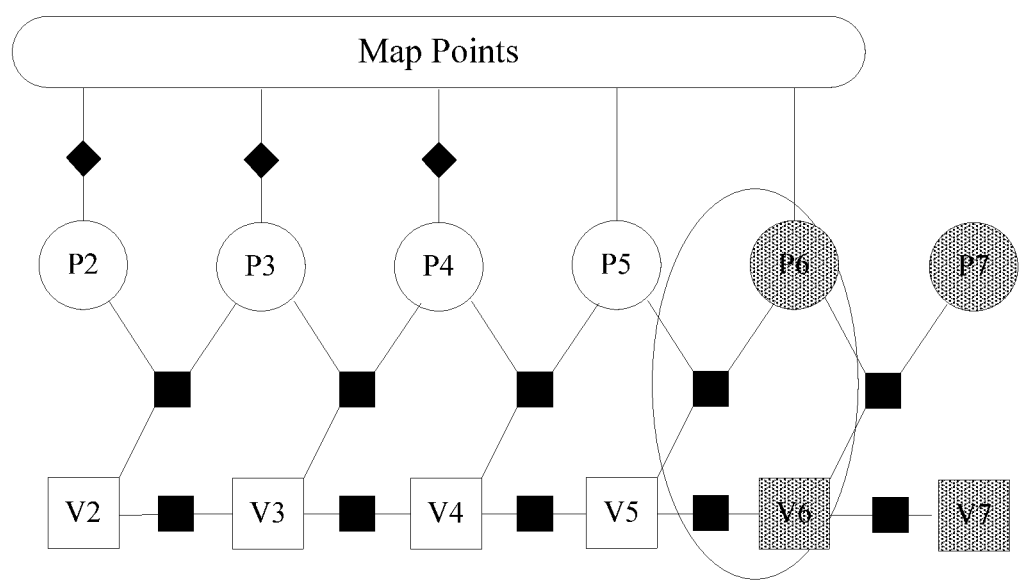
FIG. 4 illustrates states of frames in a slide window according to an embodiment of the present application.

When a second frame P7 after the acquisition point enters the stationary state enters the slide window, as illustrated in FIG. 4, since an image in the second frame P7 is similar to the image in the first frame P6, and a parallax amount is over-small, triangularization may not be implemented, and thus the vision constraint may not be introduced. In this case, the images in the first frame P6 and in the second frame P7 are similar, and therefore, the second frame P6 may be selected for marginalization. At this time, if the acquisition point keeps stationary, the trajectory may be subject to linear drift.

According to the embodiments of the present application, considering that the image in the stationary state is clear, and a track matching relationship between two frames (P6 and P7) may be apparently known according to an optical flow tracking result, the vision constraint is introduced to the entire target function to correct a process amount that is incorrectly calculated based on the pure IMU in the rotation process, and thus solve the problem of pose drift.

Figure 5:
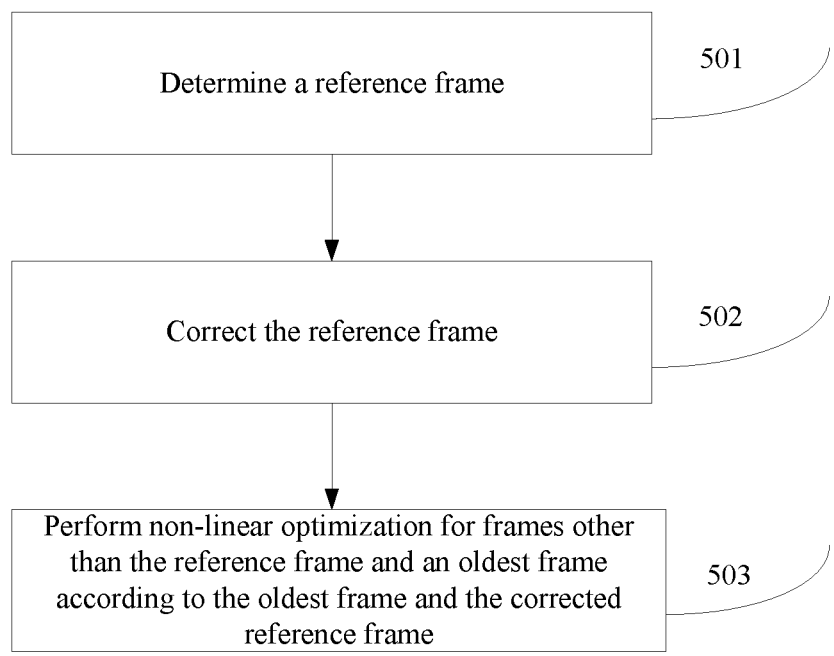
FIG. 5 illustrates a flowchart of a method for improving robustness of a visual-inertial navigation system according to an embodiment of the present application.

As illustrated in FIG. 5, an embodiment of the present application provides a method for improving robustness of a visual-inertial navigation system. The method includes the following steps:

501: A reference frame is determined.

This embodiment of the present application still employs optimization in a slide window. When a new frame enters the slide window, the system compares the current frame with a second latest frame to determine a reference frame and a frame to be marginalized.

As illustrated in FIG. 4, a $0^{th}$ frame is P2, a $4^{th}$ frame P5 is a blurred dynamic frame, and a $5^{th}$ frame P6 is a first stationary frame. When P7 enters the slide window, P7 is also a stationary frame.

Under normal conditions, when P7 enters the slide window, the system may determine a frame to be marginalized according to a count of points tracked in the current frame and a parallax amount between adjacent frames. For example, when P7 enters the slide window, if the parallax amount between P6 and P7 is small, the second latest frame P6 needs to be marginalized, and the second latest frame is determined as a frame to be marginalized; and if the parallax amount between P6 and P7 is large, it is considered that P7 embodies more representation information, the oldest frame is selected for marginalization, and the oldest frame is determined as the frame to be marginalized.

It is assumed that the frame to be marginalized is the second latest frame, then the system further judges whether P7 and P6 are the same, that is, whether P7 is a stationary frame like P6. Generally, the judgment may be performed according as whether a count of points successfully tracked in the current frame and the second latest frame is greater than a predetermined threshold. When the count of points is greater than the predetermined threshold, it is considered that the current frame and the second latest frame are the same, that is, the frames are both in the stationary state.

When the current frame and the second latest frame are the same, the system determines the oldest frame as the frame to be marginalized; and when the current frame and the second latest frame are different, the system determines the second latest frame as the frame to be marginalized.

By default, the system may not define an initial reference frame. That is, when no stationary frame is present in the system, no reference frame may be present in the system. A reference frame may be defined in the system only when two or more frames are stationary frames.

502: The determined reference frame is corrected.

When it is judged that the current frame and the second latest frame are both in the stationary state, considering that the image in the stationary stage is clear, and a track matching relationship between two frames (P6 and P7) may be apparently known according to an optical flow tracking result, and without considering the vision constraint in the current VIO framework, the vision constraint is introduced into the entire target function to correct a process amount that is incorrectly calculated based on the pure IMU in the rotation process, and thus solve the problem of pose drift by correcting the velocity and the rotation of the reference frame.

503: Non-linear optimization is performed for frames other than the reference frame and an oldest frame according to the oldest frame and the corrected reference frame.

The system fixes the corrected reference frame and the oldest frame, does not optimize the two frames in the non-linear optimization solving process, but only performs non-linear optimization solving for frames other than the two frames based on the corrected reference frame and the oldest frame.

After the reference frame is determined, the system may judge whether the reference frame is in the slide window. If the reference frame is not in the slide window, the non-linear optimizing solving is performed in a common way, and the non-linear optimization is performed for each frame. When the reference frame is in the slide window, the system may fix the oldest frame P2 and the reference frame P6, and do not optimize these two frames. Instead, the system only performs the non-linear optimization solving for frames other than the oldest frame P2 and the reference frame P6.

Further, whether the frame to be marginalized is the oldest frame is judged. If the frame to be marginalized is the oldest frame, after the frames other than the oldest frame and the reference frame are linearly optimized, the reference is translated towards the oldest frame by one frame to ensure that the current reference frame is still the reference frame when a next image comes. If the frame to be marginalized is not the oldest frame but the second latest frame, the non-linear optimization is directly performed. That is, the current stationary frame is used as the reference frame when a next image comes.

In the method according to this embodiment of the present application, by correcting the reference frame, fixing the reference frame and the oldest frame, and introducing a new vision constraint to the system, the conventional vision constraint and inertial constraint mechanism is optimized, the problem of drift of the trajectory is better solved, and the robustness of the system is remarkably improved.

Figure 6:
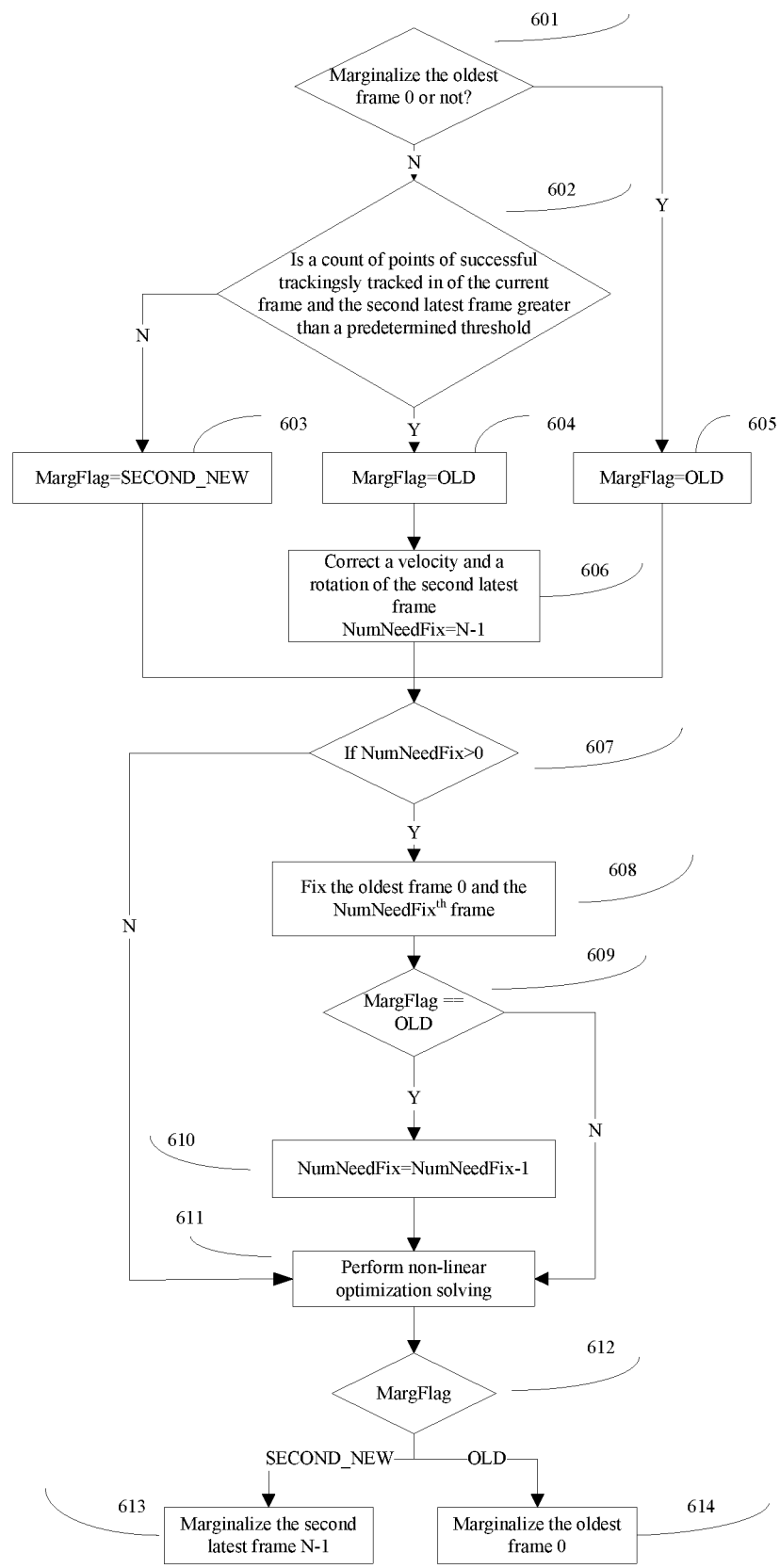
FIG. 6 illustrates a flowchart of a method for improving robustness of a visual-inertial navigation system according to an embodiment of the present application.
Figures 1, 7:
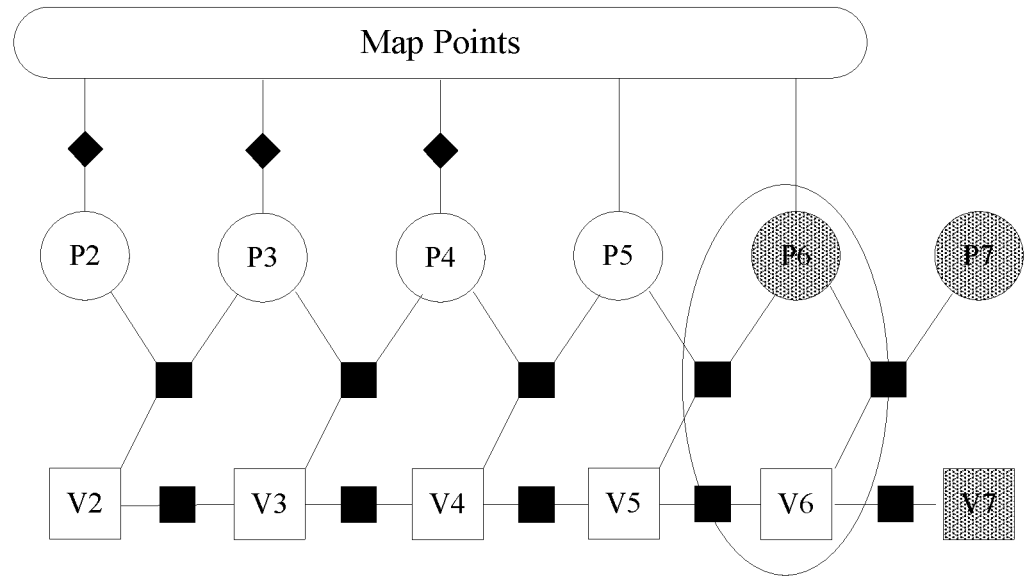
Figures 2, 7:
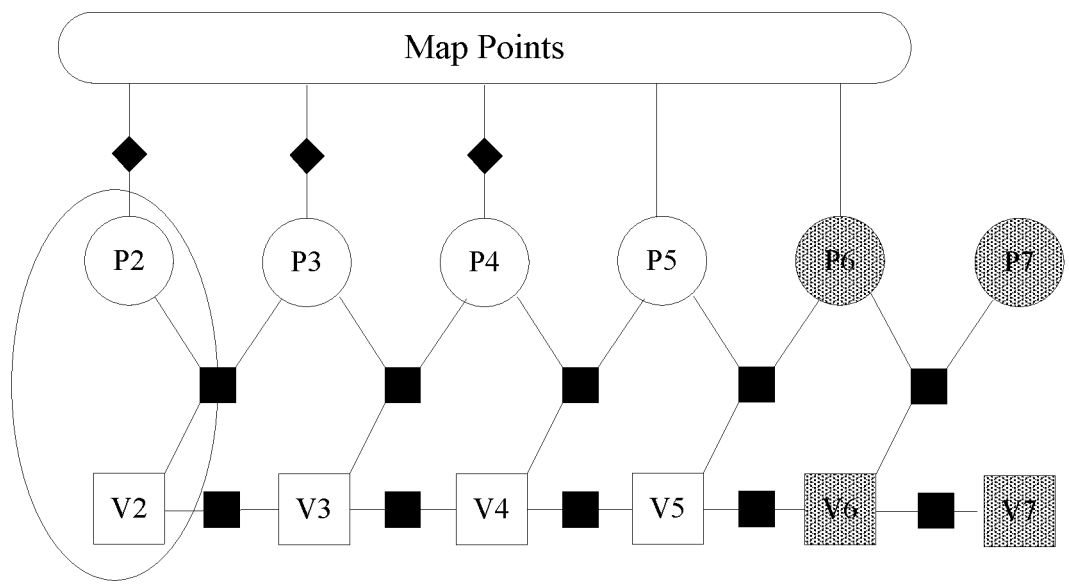
Figures 3, 7:
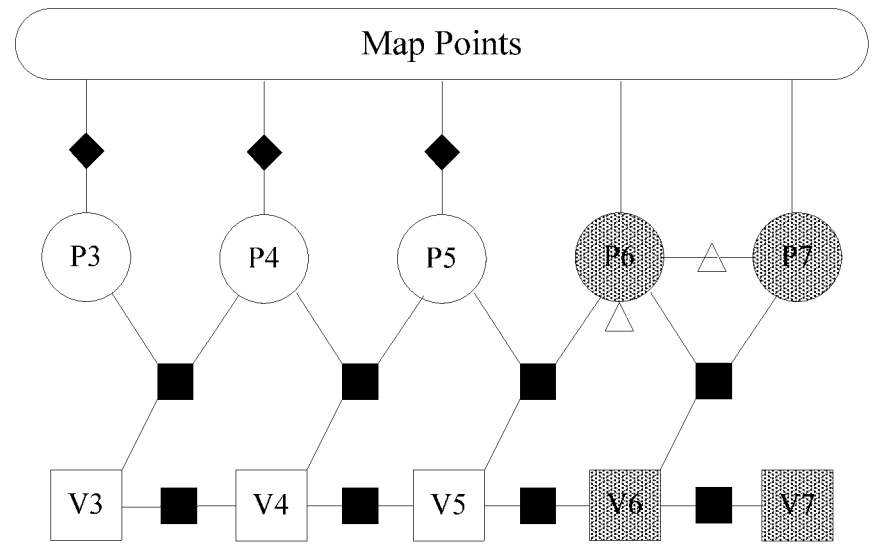
Figures 4, 7:
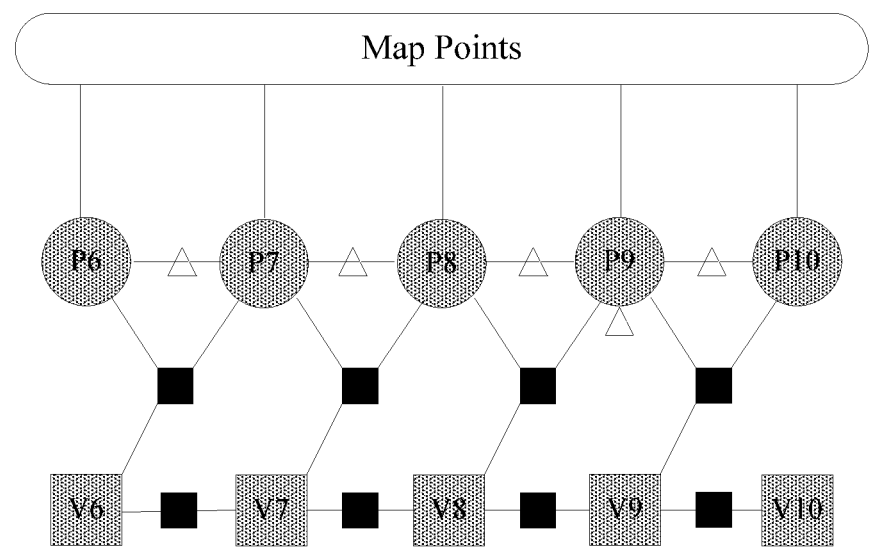

Another embodiment of the present application illustrates a detailed flowchart, as illustrated in FIG. 6. It is assumed that detailed description is given based on the frame mode as illustrated in FIG. 7-1, and in FIG. 3, the frame P5 is a dynamic frame and the frame P6 is a stationary frame. It is herein further assumed that the slide window has a width of N=5, the oldest frame in the system is the $0^{th}$ frame, MargFlag is defined as a flag bit of the frame to be marginalized, OLD represents the oldest frame, SECOND_NEW represents the second latest frame, NumNeedFix represents a flag bit of the reference frame, and an initial value of NumNeedFix is defined as −1.

601: The current frame entering the slide window is identified to judge whether the current frame is the oldest frame to be marginalized.

Generally, the system identifies the frame to be marginalized according to the count of points tracked in the current frame and the parallax amount between adjacent frames. Herein, the oldest frame is the $0^{th}$ frame, and a total frame count in the slide window is N+1. Therefore, the current frame is an $N^{th}$ frame, and the second latest frame is an $(N-1)^{th}$ frame.

If the parallax amount between the current frame and the second latest frame is large, it is considered that the current frame is an important frame, and the oldest frame is marginalized.

If the parallax amount between the current frame and the second latest frame is small, it is considered that the current frame is similar to the second latest frame, and the second latest frame is marginalized.

In FIG. 3, P5 is a dynamic frame, and P6 is a first stationary frame. Therefore, a parallax amount between P5 and P6 is large. In this case, the frame to be marginalized is the oldest frame P1.

According to FIG. 6, the process skips to step 605.

605: The frame to be marginalized is defined as the oldest frame.

It is defined that MargFlag=OLD, and the process skips to step 607.

607: Whether NumNeedFix is greater than 0 is judged.

In the system, the initial value of NumNeedFix is predefined as −1. Therefore, NumNeedFix<0, and the process skips to step 611.

611: Non-linear optimization solving is performed.

The non-linear optimization is performed for all the frames in the slide window based on the corrected reference frame and the oldest frame.

612: The value of MargFlag is judged.

If MargFlag=OLD, the oldest frame P1 is marginalized.

If MargFlag=SECOND_NEW, the second latest frame is marginalized.

As seen from FIG. 3, the system may marginalize the oldest frame P1. Afterwards, the system constantly monitors coming of a next frame.

As illustrated in FIG. 7-1, it is assumed that the frame P7 enters the slide window, the frame P7 is a stationary frame, and P6 and P7 are the same image. The system may perform the following operations:

601: Whether the oldest frame is to be marginalized is judged.

Since P6 and P7 are likewise stationary frames, and the parallax amount therebetween is small, the system needs to marginalize the second latest frame and maintain the oldest frame, as illustrated in FIG. 7-1. Then the process skips to step 602.

602: Whether a count of points successfully tracked in the current frame and the second latest frame is greater than a predetermined threshold is judged.

The difference between the frame P6 and the frame P7 is determined according to the count of points successfully tracked in the current frame and the second latest frame. Generally, the threshold is defined as 97%. If the count of points successfully tracked in these two frames is greater than 97%, it is considered that the two images are the same images, and the process skips to step 604. If the count of points successfully tracked in these two frames is less than 97%, it is considered that these two images are different from each other, and the process skips to step 603.

604: It is defined that MargFlag=OLD.

When P7 and P7 are two identical images, the frame to be marginalized is defined as the oldest frame, and it is defined that MargFlag=OLD, as illustrated in FIG. 7-2. The process skips to step 606.

606: A velocity and a rotation of the second latest frame are corrected, and NumNeedFix is defined as N−1.

When it is judged that the current frame and the second latest frame are both in the stationary state, considering that the image in the stationary stage is clear, and a track matching relationship between two frames (P6 and P7) may be apparently known according to an optical flow tracking result, and without considering the vision constraint in the current VIO framework, the vision constraint is introduced into the entire target function to correct a process amount that is incorrectly calculated based on the pure IMU in the rotation process, and thus solve the problem of pose drift.

When the image is stationary, that is, the count of points tracked in two adjacent frames is greater than a predetermined threshold, a velocity difference between these two frames is 0.

In addition, according to a velocity measurement error equation of IMU pre-integration, the following formula may be obtained:

$$R_w^{b_k}(v_{b_{k+1}}^w - v_{b_k}^w + g^w \Delta t_k) - \beta_{b_{k+1}}^{b_k} = 0 \quad (1)$$

$g^w$ represents a gravity acceleration in the world coordinate system, $R_w^{b_k}$ represents rotation from the world coordinate system to the local coordinate system of the IMU in a $k^{th}$ frame, $\Delta t_k$ represents a time interval between the $k^{th}$ frame and a $(k+1)^{th}$ frame, and $\beta_{b_{k+1}}^{b_k}$ represents a velocity variation amount from the $k^{th}$ frame to the $(k+1)^{th}$ frame obtained by IMU pre-integration.

$$\beta_{b_{k+1}}^{b_k} = \int_{t \in [k, k+1]} [R_t^{b_k}(\hat{a}_t - b_{a_t})] dt \quad (2)$$

$R_t^{b_k}$ represents rotation from the local coordinate system of the IMU at an instant t to the local coordinate system of the IMU at an instant of the $k^{th}$ frame, $\hat{a}_t$ represents a measured value of an accelerometer at the instant k, and $b_{a_t}$ represents a deviation of the acceleration at the instant t.

Formula (1) may be organized as follows:

$$v_{b_{k+1}}^w = v_{b_k}^w - g^w \Delta t_k + R_{b_k}^w \beta_{b_{k+1}}^{b_k} \quad (3)$$

Since the image is stationary, the velocities of the $k^{th}$ frame and the $(k+1)^{th}$ frame are 0, that is:

$$v_{b_k}^w = v_{b_{k+1}}^w = 0 \quad (4)$$

Formula (1) may be simplified as:

$$R_{b_k}^w \beta_{b_{k+1}}^{b_k} - g^w \Delta t_k = 0 \quad (5)$$

It is thereby derived that:

$$R_{b_k}^w = \frac{g^w \Delta t_k}{\beta_{b_{k+1}}^k} \quad (6)$$

Analysis on formula (4) reveals that when $R_{b_k}^w$ is incorrectly calculated, the velocity variation amount obtained by IMU pre-integration may not better offset a velocity variation caused due to the gravity acceleration, and thus an extra and unexpected velocity component is generated. In this case, a correct $R_{b_k}^w$ may be calculated according to formula (5), and may be used as a rotation state of the second latest frame, that is, the $k^{th}$ frame.

As known from the above, the system corrects the velocity $v_{b_{k+1}}^w$ to 0, and corrects the rotation $R_{b_k}^w$ to $$\frac{g^w \Delta t_k}{\beta_{b_{k+1}}^k}.$$

NumNeedFix is modified from −1 to N−1.

607: Whether the flag bit NumNeedFix of the reference frame is greater than 0 is judged. If the flag bit NumNeedFix is greater than 0, the process skips to step 608; and if the flag bit NumNeedFix is not greater than 0, the process skips to step 611.

As known from step 607, NumNeedFix=N−1, N being 5, and in this case, NumNeedFix=4. Therefore, NumNeedFix>0, and the process skips to step 608.

608: The oldest frame and the NumNeedFix$^{th}$ frame are fixed.

That is, the oldest frame P2 and the reference frame P6 are fixed, and the fixing means that in the non-linear optimization solving process, the non-linear optimization solving is not performed for the oldest frame and the reference frame, but only performed for the other frames.

609: Whether the frame to be marginalized is the oldest frame is judged.

That is, whether MargFlag is equal to OLD is judged. If MargFlag is equal to OLD, the process skips to step 610; and if MargFlag is not equal to OLD, the process skips to step 611.

As known from step 604, MargFlag==OLD.

610: The reference frame is translated towards the oldest frame by one frame.

That is, the flag bit NumNeedFix of the reference frame is modified to NumNeedFix−1, that is, NumNeedFix=3.

611: Non-linear optimization solving is performed.

Since the oldest frame P2 and the reference frame P6 are fixed in step 608, that is, these two frames are not involved in the non-linear optimization solving, the system performs the non-linear optimization solving only for the frames other than the oldest frame P2 and the reference frame P6 based on the corrected reference frame and the oldest frame. The non-linear optimization solving herein is the same as the conventional non-linear optimization solving, which is thus not described herein any further.

612: The frame to be marginalized is judged. If the frame to be marginalized is the oldest frame, the process skips to step 614; and if the frame to be marginalized is the second latest frame, the process skips to step 613.

The system determines the value of MargFlag, and marginalizes the corresponding frame according to the flag bit of the frame to be marginalized.

613: If MargFlag==SECOND_NEW, the second latest frame is marginalized.

614: If MargFlag==OLD, the oldest frame P2 is marginalized.

As known from step 604, the system modifies MargFlag from SECOND_NEW to OLD. Therefore, MargFlag=OLD, and the oldest frame P2 is marginalized. The frame structure upon the final optimization is as illustrated in FIG. 7-3, the frame that is marginalized is P2, the oldest frame is P3, the reference frame changes to P6, P6 is the corrected frame, and a new constraint is introduced between P6 and P7.

The system continuously monitors new frames that enter the slide window. It is assumed that the frames subsequently entering the slide window are all the same stationary frame as P7, then the system may uninterruptedly marginalize the oldest frame and constantly use the second latest frame as the reference frame for correction, and fix the oldest frame and the second latest frame for non-linear optimization solving. Finally, all the frames in the slide window change to the stationary frames that are corrected, until the image acquisition device re-moves or the image changes.

When the image acquisition device moves from a quick state to a slow state, and the image is not clear, although the system still needs to marginalize the second latest frame, the images of the two images are somewhat different. For example, when a new frame P11 enters the slide window, and the image P11 slightly changes, the system may perform the following operations:

601: Whether the oldest frame is to be marginalized is judged.

Figures 1, 8:
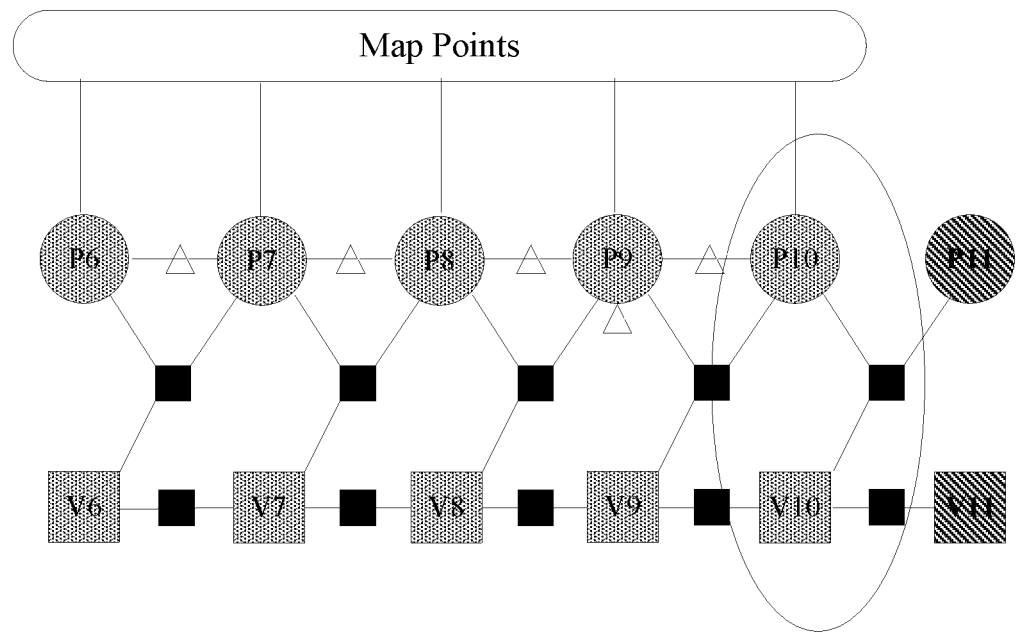
Figures 2, 8:
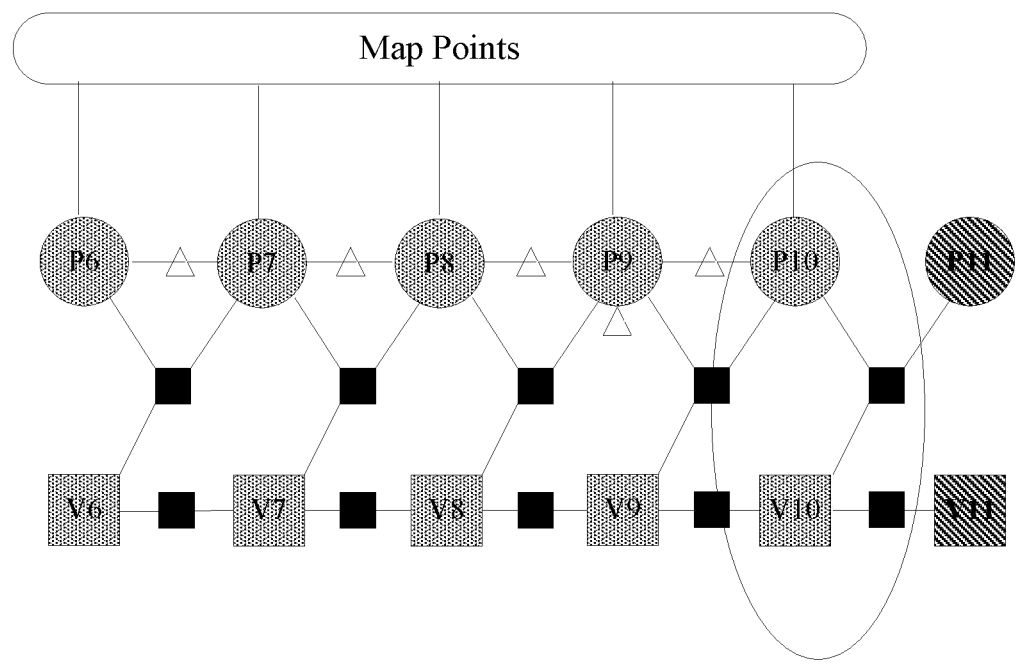
Figures 3, 8:
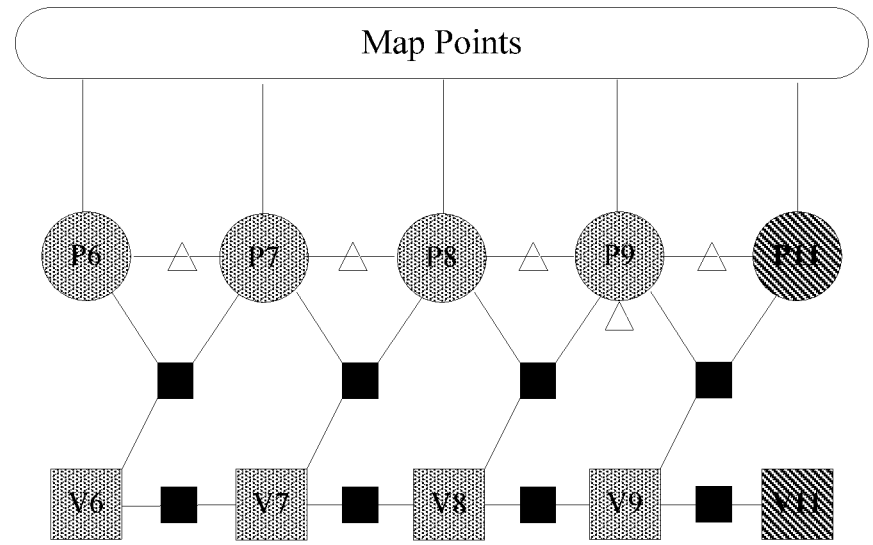

Since the images of the two frames P11 and P10 slightly change, the parallax amount therebetween is small. Therefore, the system needs to marginalize the second latest frame, and maintain the oldest frame, as illustrated in FIG. 8. In addition, the process skips to step 602.

602: Whether a count of points successfully tracked in the current frame and the second latest frame is greater than a predetermined threshold is judged.

The difference between P11 and P10 is determined. Likewise, the threshold is 97%. Since the two frames slightly change, the count of points successfully tracked in the two frames is less than 97%. Therefore, the system considers that P10 and P11 are different frames. Thus, the system may not consider that the camera is in an absolutely stationary state, and the process skips to step 603.

603: The frame to be marginalized is defined as the second latest frame.

MargFlag is defined as SECOND_NEW, and as illustrated in FIG. 8-2, the process skips to step 607.

607: Whether the flag bit NumNeedFix of the reference frame is greater than 0 is judged. If the flag bit NumNeedFix is greater than 0, the process skips to step 608; and if the flag bit NumNeedFix is not greater than 0, the process skips to step 611.

As known from the above, since the above frames are all the stationary frames, the reference frame is always the second latest frame, that is, NumNeedFix=4, which is greater than 0. Therefore, the process skips to step 608.

608: The oldest frame 0 and the NumNeedFix$^{th}$ frame are fixed.

That is, the oldest frame P6 and the reference frame P9 are fixed, and the fixing means that in the non-linear optimization solving process, the non-linear optimization solving is not performed for the oldest frame and the reference frame, but only performed for the other frames.

609: Whether the frame to be marginalized is the oldest frame is judged.

As known from step 603, MargFlag=SECOND_NEW is not the oldest frame, and the process skips to step 611.

611: Non-linear optimization solving is performed.

Since the oldest frame P6 and the reference frame P9 are fixed in step 608, that is, these two frames are not involved in the non-linear optimization solving, the system performs the non-linear optimization solving only for the frames other than the oldest frame P6 and the reference frame P9. The non-linear optimization solving herein is the same as the conventional non-linear optimization solving, which is thus not described herein any further.

612: The frame to be marginalized is judged. If the frame to be marginalized is the oldest frame, the process skips to step 614; and if the frame to be marginalized is the second latest frame, the process skips to step 613.

As known from the above, MargFlag=SECOND_NEW. Therefore, the process skips to step 613.

613: If MargFlag==SECOND_NEW, the second latest frame is marginalized.

Therefore, when the new frame is slightly different from the second latest frame, the system may continuously maintain the oldest frame P6 and the reference frame P9 unchanged, and marginalize the second latest frame P10, as illustrated in FIG. 8-3. The system may constantly monitor the other frames entering the slide window. If other frames that are slightly different enter the slide window, the system may continuously maintain the oldest frame P6 and the reference frame P9 unchanged, to practice optimization based on the most accurate frame.

Figures 1, 9:
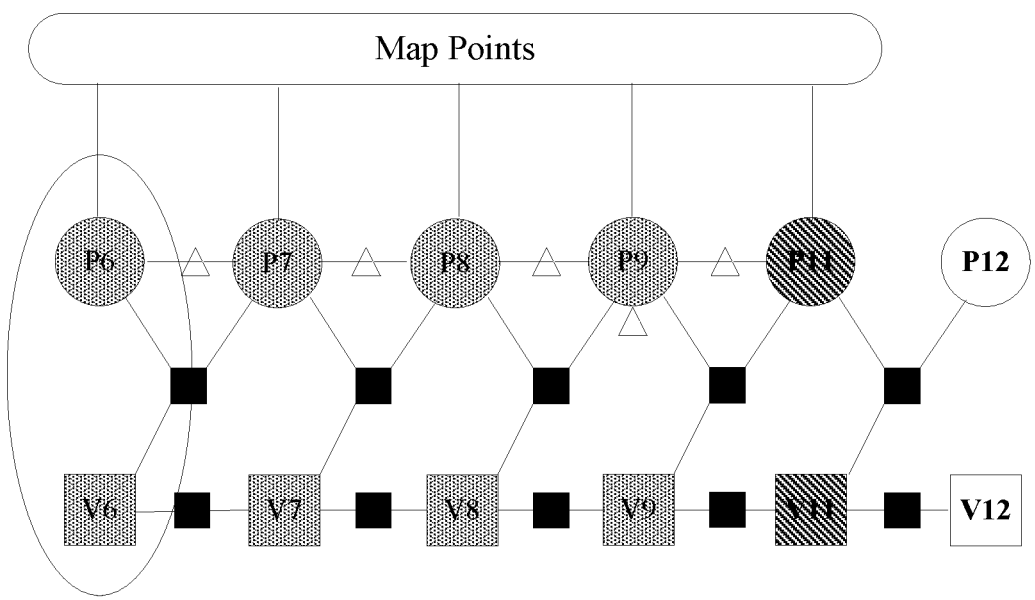
Figures 2, 9:
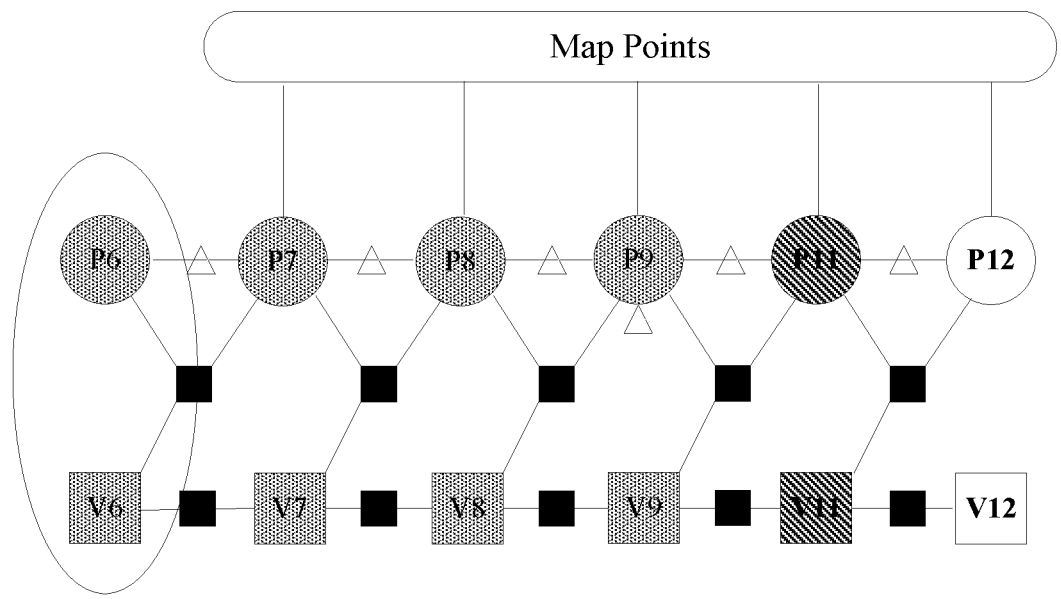
Figures 3, 9:
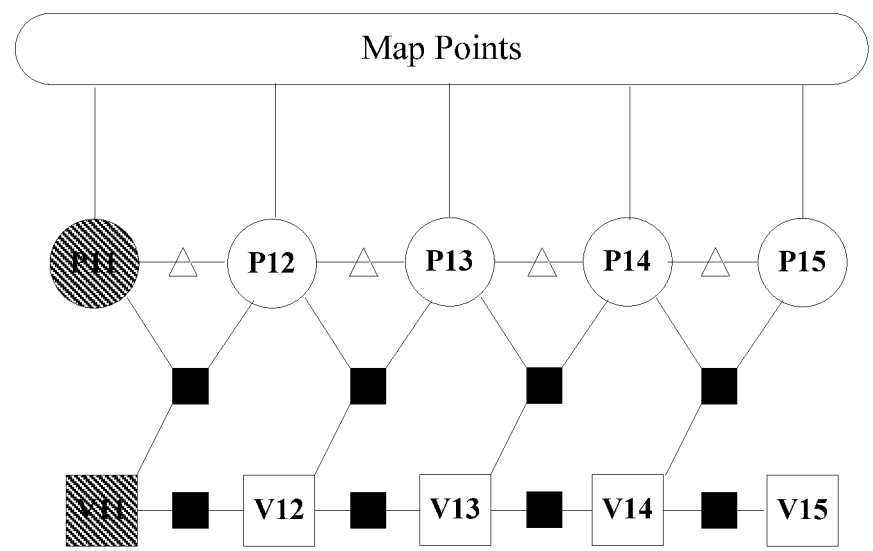

It is assumed that after the image acquisition device moves and acquires a new frame P12 that enters the slide window, then the system may perform the following operations, as illustrated in FIG. 9-1, wherein P12 is a moving frame in a normal movement state.

601: Whether the oldest frame is to be marginalized is judged.

Since the frame P12 is a frame acquired by the image acquisition device in a moving state, and the parallax amount between P12 and P11 and the difference between the count of points tracked in P11 and the count of points tracked in the current frame are both large, the system may determine to marginalize the oldest frame P6. The process skips to step 605.

605: It is defined that MargFlag=OLD.

The frame to be marginalized is defined as the oldest frame. That is, it is defined that MargFlag=OLD. The process skips to step 607.

607: Whether the flag bit NumNeedFix of the reference frame is greater than 0 is judged. If the flag bit NumNeedFix is greater than 0, the process skips to step 608; and if the flag bit NumNeedFix is not greater than 0, the process skips to step 611.

As seen from FIG. 8-3, the reference frame is P9, that is, NumNeedFix=4. Therefore, NumNeedFix>0, and the process skips to step 608.

608: The oldest frame and the NumNeedFix$^{th}$ frame are fixed.

That is, the oldest fame P6 and the frame P9 are fixed. Subsequently, the non-linear optimization solving is performed only for the other frames.

609: Whether MargFlag is equal to OLD is judged.

As seen from FIG. 9-1, the frame to be marginalized is the oldest frame. Therefore, MargFlag==OLD, and the process skips to step 610.

610: The reference frame is translated towards the oldest frame by one frame.

That is, the flag bit NumNeedFix of the reference frame is modified to NumNeedFix−1, that is, NumNeedFix=3.

611: Non-linear optimization solving is performed.

Non-linear optimization solving is performed for frames other than P6 and P9.

612: The frame to be marginalized is judged. If the frame to be marginalized is the oldest frame, the process skips to step 614; and if the frame to be marginalized is the second latest frame, the process skips to step 613.

As known from the above, MargFlag=OLD, and therefore, the process skips to step 614.

614: If MargFlag==OLD, the oldest frame P6 is marginalized.

As illustrated in FIG. 9-2, when a new moving frame P12 enters the slide window, since the moving frame P12 is greatly different from the second latest frame, the system may fix the oldest frame and the reference frame. The reference frame is the corrected reference frame. The non-linear optimization solving is performed only for the other frames, and the oldest frame is marginalized. That is the frame P6 is marginalized, the oldest frame is P7, the reference frame is still P9, and a new constraint is also successfully introduced between P11 and P12.

The system may continuously monitor the new frames entering the slide window. It is assumed that the frames subsequently entering the slide window are all different moving frames like P12, the system may constantly fix the reference frame to P9 since P9 is the corrected frame, and move the reference frame towards the oldest frame until the reference frame is move out of the slide window. In this case, the system may resume the vision constraint in a normal moving state.

It should be noted that when the image acquisition device is in uniform movements, the method may also be applicable. In a uniform movement state, in step 602, whether the current frame is the same as the second latest frame is judged by judging the moving velocity of the image acquisition device, the rotation of the gyroscope and the like, and hence the corresponding operation is performed according to the actual situation. In step 606, when the velocity and the rotation of the reference frame need to be corrected, since the image acquisition device is in the uniform movement state, the moving velocities of the current frame and the second latest frame $v_{b_k}^w = v_{b_{k+1}}^w = C$, wherein C is a measured fixed value. Accordingly, formula (1) may be simplified as $R_{b_k}^w \beta_{b_{k+1}}^{b_k} - g^w \Delta t_k = 0$. Analogously, the rotation upon the correction is $$R_{b_k}^w = \frac{g^w \Delta t_k}{\beta_{b_{k+1}}^{b_k}}.$$

Therefore, in the uniform movement state, the objective of the present application may be likewise practiced by the embodiments of the present application.

According to the above embodiments, based on the track matching relationship between stationary frames, a new constraint is introduced to correct the reference frame, and the process amount that is incorrectly calculated based on the pure IMU in the rotation process is corrected based on the corrected reference frame, and thus solve the problem of pose drift.

Figure 10:
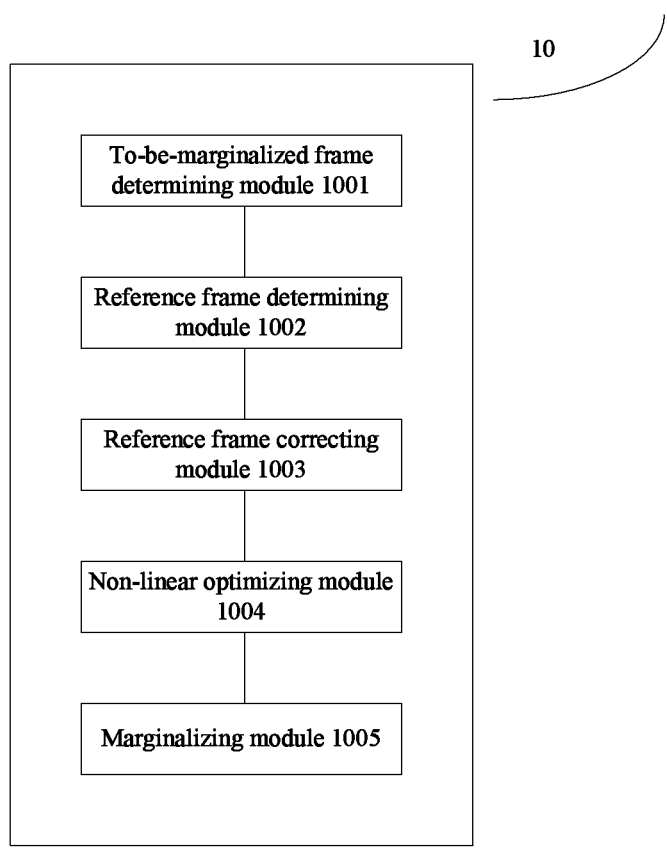
FIG. 10 illustrates an apparatus for improving robustness of a visual-inertial navigation system according to an embodiment of the present application.

An embodiment of the present application further provides an apparatus 10 for improving robustness of a vision inertial navigation system. The apparatus 10 is configured to perform the method for improving robustness of a vision inertial navigation system according to the above embodiments. As illustrated in FIG. 10, the apparatus 10 specifically includes:

a reference frame determining module 1002, configured to determine a reference frame in a current a slide window;

a reference frame correcting module 1003, configured to correct the reference frame; and a non-linear optimizing module 1004, configured to perform non-linear optimization for frames other than the reference frame and an oldest frame according to the oldest frame and the corrected reference frame.

The reference frame determining module is further configured to determine a second latest frame of the same frame as the reference frame.

Further, the apparatus further includes a to-be-marginalized frame determining module 1001, configured to: judge whether the oldest frame is a frame to be marginalized according to a current frame; determine the oldest frame as the frame to be marginalized if the oldest frame is the frame to be marginalized; further judge whether the current frame and the second latest frame are the same if the oldest frame is not the frame to be marginalized; determine the oldest frame as the frame to be marginalized if the current frame and the second latest frame are the same; and notify the reference frame determining module to determine the second latest frame as the reference frame if the current frame and the second latest frame are not the same. During determining whether the current frame and the second latest frame are the same, the to-be-marginalized frame determining module is further configured to: judge whether a count of points successfully tracked in the current frame and the second latest frame is less than a predetermined threshold; determine that the current frame and the second latest frame are the same if the count of points is not less than the predetermined threshold; and determine that the current frame and the second latest frame are not the same if the count of points is less than the predetermined threshold. The specific process is similar to the method according to the above embodiments, which is not described herein any further.

Further, the reference frame correcting module 1003 is configured to define a velocity of the reference frame as $v_{b_k}^w = 0$ by calculation, and define rotation of the reference frame as:

$$R_{b_k}^w = \frac{g^w \Delta t_k}{\beta_{b_{k+1}}^{b_k}}.$$

The apparatus further includes a marginalizing module, configured to marginalize a frame to be marginalized.

The to-be-marginalized frame determining module is further configured to judge whether a frame to be marginalized is the oldest frame, marginalize the oldest frame and translate the reference frame towards the oldest frame by one frame upon performing non-linear optimization for the frames other than the oldest frame and the reference frame if the frame to be marginalized is not the oldest frame.

The non-linear optimizing module is further configured to: judge whether the reference frame is in the slide window; perform non-linear optimization for frames other than the oldest frame and the reference frame, and notify the marginalizing module to marginalize the second latest frame if the reference frame is in the slide window; and perform non-linear optimization for all the frames if the reference frame is not in the slide window.

The marginalizing module is configured to marginalize the corresponding frame according to a flag bit of MargFlag.

According to the apparatus for improving robustness of a vision inertial navigation system in the above embodiment, based on the track matching relationship between stationary frames, a new constraint is introduced to correct the reference frame, and the process amount that is incorrectly calculated based on the pure IMU in the rotation process is corrected based on the corrected reference frame, and thus solve the problem of pose drift.

An embodiment of the present application provides a non-volatile computer-readable storage medium, wherein the computer-readable storage medium stores at least one computer-executable instruction, which may be executed to perform the method for improving robustness of a vision inertial navigation system in any of the above method embodiments.

Figure 11:
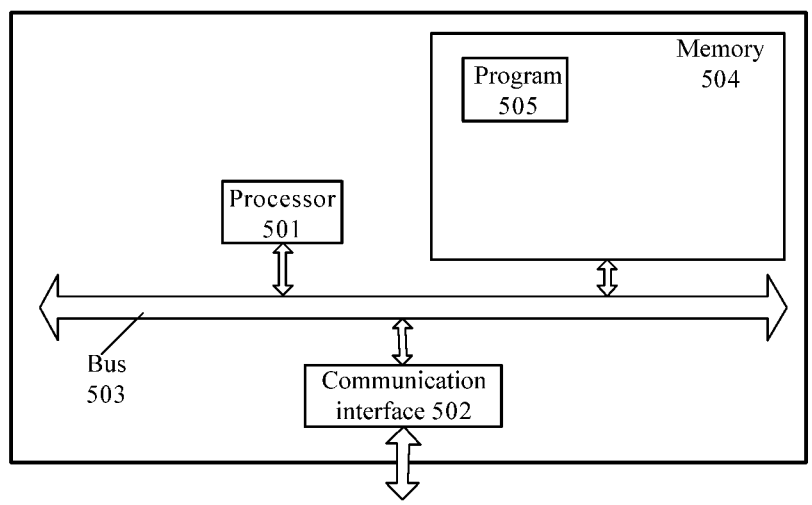
FIG. 11 illustrates a structural diagram of a robot according to an embodiment of the present application.

FIG. 11 is a schematic structural diagram of a robot according to an embodiment of the present application. The specific embodiments of the present application set no limitation to the practice of the robot.

As illustrated in FIG. 11, the robot may include: a processor 501, a communication interface 502, a memory 504 and a communication bus 503.

The processor, the communication interface and the memory communicate with each other via the communication bus.

The communication interface is configured to communicate with a network element such as a client, a server or the like.

The processor is configured to execute a program 505, and may specifically perform steps in the embodiments of the method for improving robustness of a visual-inertial navigation system.

Specifically, the program may include a program code, wherein the program code includes a computer-executable instruction.

The processor may be a central processing unit (CPU) or an application specific integrated circuit (ASIC), or configured as one or more integrated circuits for implementing the embodiments of the present application. The robot includes one or more processors, which may be the same type of processors, for example, one or more CPUs, or may be different types of processors, for example, one or more CPUs and one or more ASICs.

The memory is configured to store the program 810. The memory may include a high-speed RAM memory, or may also include a non-volatile memory, for example, at least one magnetic disk memory.

The program may be specifically configured to cause the processor to perform the following operations:

determining a reference frame;

correcting the reference frame; and performing non-linear optimization for frames other than the reference frame and an oldest frame.

Further, the program may also control the controller to perform the following operation:

determining a second latest frame of the same frame as the reference frame.

The further determining a frame to be marginalized includes:

judging, according to a current frame, whether the oldest frame is a frame to be marginalized;

determining the oldest frame as the frame to be marginalized if the oldest frame is the frame to be marginalized; and further judging whether the current frame and a second latest frame are the same if the oldest frame is not the frame to be marginalized, determining the second latest frame as the reference frame and determining the oldest frame as the frame to be marginalized if the current frame and the second latest frame are the same, and determining the second latest frame as the frame to be marginalized and not correcting the reference frame subsequently if the current frame and the second latest frame are not the same.

The judging whether the current frame and a second latest frame are the same includes:

judging whether a count of points successfully tracked in the current frame and the second latest frame is less than a predetermined threshold; determining that the current frame and the second latest frame are the same if the count is not less than the predetermined threshold; and determining that the current frame and the second latest frame are not the same if the count is less than the predetermined threshold.

The correcting the reference frame includes: correcting a velocity and a rotation of the reference frame, which includes:

defining the velocity of the reference frame as $v_{b_k}^w = 0$; and defining the rotation of the reference frame as $$R_{b_k}^w = \frac{g^w \Delta t_k}{\beta_{b_{k+1}}^{b_k}} \circ$$

The performing non-linear optimization for frames other than the oldest frame and the reference frame further includes:

judging whether a frame to be marginalized is the oldest frame, marginalizing the oldest frame and translating the reference frame towards the oldest frame by one frame upon performing non-linear optimization for the frames other than the oldest frame and the reference frame if the frame to be marginalized is not the oldest frame.

The performing non-linear optimization for frames other than the oldest frame and the reference frame further includes:

judging whether a frame to be marginalized is the oldest frame, and marginalizing a second latest frame upon performing non-linear optimization for the frames other than the oldest frame and the reference frame if the frame to be marginalized is not the oldest frame.

Prior to the performing non-linear optimization for frames other than the oldest frame and the reference frame, the method further includes:

judging whether the reference frame is in a slide window, and performing non-linear optimization for all the frames if the reference frame is not in the slide window.

The algorithms and displays provided herein are not inherently related to any specific robot, virtual system or other device. Various general-purpose systems may also be used with the teachings herein. According to the above description, the structure required for constructing such systems is obvious. In addition, the present application is not directed to any specific programming language. It should be understood that the content of the present application described herein may be carried out utilizing various programming languages, and that the above description for a specific language is for the sake of disclosing preferred embodiments of the present application.

In the specification provided herein, a plenty of particular details are described. However, it may be understood that an embodiment of the present application may also be practiced without these particular details. In some embodiments, well known methods, structures and technologies are not illustrated in detail so as not to obscure the understanding of the specification.

Likewise, it shall be understood that, to streamline the present application and facilitate understanding of one or more of various aspects of the present application, in the above description of the exemplary embodiments of the present application, various features of the present application are sometimes incorporated in an individual embodiment, drawing or description thereof. However, the method according to the present application shall not be explained to embody the following intention: the present application for which protection is sought claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present application.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present application and different embodiments may be derived. For example, in the claims appended hereinafter, any one of the embodiments for which protection is sought may be practiced in any combination manner.

Embodiments of the individual components of the present application may be implemented in hardware, or in a software module running one or more processors, or in a combination thereof. It will be appreciated by those skilled in the art that, in practice, some or all of the functions of some or all of the components in the message prompting apparatus according to individual embodiments of the present application may be implemented using a microprocessor or a digital signal processor (DSP). The present application may also be implemented as an apparatus of a device program (e.g., a computer program and a computer program product) for performing a part or all of the method as described herein. Such a program implementing the present application may be stored on a computer-readable medium, or may be stored in the form of one or more signals. Such a signal may be obtained by downloading it from an Internet website, or provided on a carrier signal, or provided in any other form.

It should be noted that the above embodiments illustrate rather than limit the present application, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The word "a" or "an" used before an element does not exclude the presence of a plurality of such elements. The present application may be implemented by means of a hardware including several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A method for improving robustness of a visual-inertial navigation system, comprising:
    determining a reference frame, wherein the reference frame is a second latest frame of the same frames, and wherein the same frames comprises at least two frames with the same image, and the second latest frame is a frame of which the time of entering a slide window is the second latest in the same frames;
    correcting the reference frame, wherein the correcting the reference frame comprises: correcting a velocity and a rotation of the reference frame; and
    performing non-linear optimization for frames other than the reference frame and an oldest frame according to the oldest frame and the corrected reference frame.

2. The method according to claim 1, wherein the determining the reference frame further comprising determining a frame to be marginalized, the determining the frame to be marginalized comprising:
    judging, according to a current frame, whether the oldest frame is a frame to be marginalized;
    determining the oldest frame as the frame to be marginalized if the oldest frame is the frame to be marginalized; and
    further judging whether the current frame and a second latest frame are the same if the oldest frame is not the frame to be marginalized;
    determining the second latest frame as the reference frame and determining the oldest frame as the frame to be marginalized if the current frame and the second latest frame are the same.

3. The method according to claim 2, wherein if the current frame and the second latest frame are not the same, the second latest frame is determined as the frame to be marginalized, and the reference frame is not corrected subsequently.

4. The method according to claim 2, wherein the judging whether the current frame and the second latest frame are the same comprises:
    judging whether a count of points successfully tracked in the current frame and the second latest frame is less than a predetermined threshold;
    determining that the current frame and the second latest frame are the same if the count is not less than the predetermined threshold; and
    determining that the current frame and the second latest frame are not the same if the count is less than the predetermined threshold.

5. The method according to claim 1, wherein the correcting the reference frame comprises:
    defining the velocity of the reference frame as $v_{b_k}^w = 0$; and
    defining the rotation of the reference frame as $$R_{b_k}^w = \frac{g^w \Delta t_k}{\beta_{b_{k+1}}^{b_k}}.$$

6. The method according to claim 1, wherein the performing non-linear optimization for frames other than the reference frame and the oldest frame comprises:
    judging whether a frame to be marginalized is the oldest frame; and marginalizing the oldest frame and translating the reference frame towards the oldest frame by one frame upon performing non-linear optimization for the frames other than the oldest frame and the reference frame if the frame to be marginalized is the oldest frame.

7. The method according to claim 1, wherein the performing non-linear optimization for frames other than the reference frame and an oldest frame comprises:
judging whether a frame to be marginalized is the oldest frame; and
marginalizing a second latest frame upon performing non-linear optimization for the frames other than the oldest frame and the reference frame if the frame to be marginalized is not the oldest frame.

8. The method according to claim 1, wherein prior to the performing non-linear optimization for frames other than the reference frame and the oldest frame, the method further comprises:
judging whether the reference frame is in a slide window; and
performing non-linear optimization for all the frames if the reference frame is not in the slide window.

9. A robot, comprising: a processor, a memory, a communication interface and a communication bus; wherein the processor, the memory and the communication bus communicate with each other via the communication bus; and
the memory is configured to store at least one executable instruction, wherein the executable instruction, when being executed by the processor, causes the processor to perform the steps of:
determining a reference frame, wherein the reference frame is a second latest frame of the same frame, and wherein the same frames comprises at least two frames with the same image, and the second latest frame is a frame of which the time of entering a slide window is the second latest in the same frames;
correcting the reference frame, wherein the correcting the reference frame comprises: correcting a velocity and a rotation of the reference frame; and
performing non-linear optimization for frames other than the reference frame and an oldest frame according to the oldest frame and the corrected reference frame.

10. The robot according to claim 9, wherein the determining the reference frame further comprising determining a frame to be marginalized, the determining the frame to be marginalized comprising:
judging, according to a current frame, whether the oldest frame is a frame to be marginalized;
determining the oldest frame as the frame to be marginalized if the oldest frame is the frame to be marginalized; and
further judging whether the current frame and a second latest frame are the same if the oldest frame is not the frame to be marginalized;
determining the second latest frame as the reference frame and determining the oldest frame as the frame to be marginalized if the current frame and the second latest frame are the same.

11. The robot according to claim 10, wherein if the current frame and the second latest frame are not the same, the second latest frame is determined as the frame to be marginalized, and the reference frame is not corrected subsequently.

12. The robot according to claim 10, wherein the judging whether the current frame and the second latest frame are the same comprises:
judging whether a count of points successfully tracked in the current frame and the second latest frame is less than a predetermined threshold;
determining that the current frame and the second latest frame are the same if the count is not less than the predetermined threshold; and
determining that the current frame and the second latest frame are not the same if the count is less than the predetermined threshold.

13. The robot according to claim 9, wherein the correcting the reference frame comprises:
defining the velocity of the reference frame as $v_{b_k}^w=0$; and
defining the rotation of the reference frame as $$R_{b_k}^w = \frac{g^w \Delta t_k}{\beta_{b_{k+1}}^{b_k}}.$$

14. The robot according to claim 9, wherein the performing non-linear optimization for frames other than the reference frame and the oldest frame comprises:
judging whether a frame to be marginalized is the oldest frame; and
marginalizing the oldest frame and translating the reference frame towards the oldest frame by one frame upon performing non-linear optimization for the frames other than the oldest frame and the reference frame if the frame to be marginalized is the oldest frame.

15. The robot according to claim 9, wherein the performing non-linear optimization for frames other than the reference frame and an oldest frame comprises:
judging whether a frame to be marginalized is the oldest frame; and
marginalizing a second latest frame upon performing non-linear optimization for the frames other than the oldest frame and the reference frame if the frame to be marginalized is not the oldest frame.

16. A computer-readable storage medium, the storage medium storing at least one executable instruction; wherein the executable instruction, when being executed, causes a processor to perform the steps of:
determining a reference frame, wherein the reference frame is a second latest frame of the same frames, and wherein the same frames comprises at least two frames with the same image, and the second latest frame is a frame of which the time of entering a slide window is the second latest in the same frames;
correcting the reference frame, wherein the correcting the reference frame comprises: correcting a velocity and a rotation of the reference frame; and
performing non-linear optimization for frames other than the reference frame and an oldest frame according to the oldest frame and the corrected reference frame.

* * * * *